UNITED STATES PATENT OFFICE.

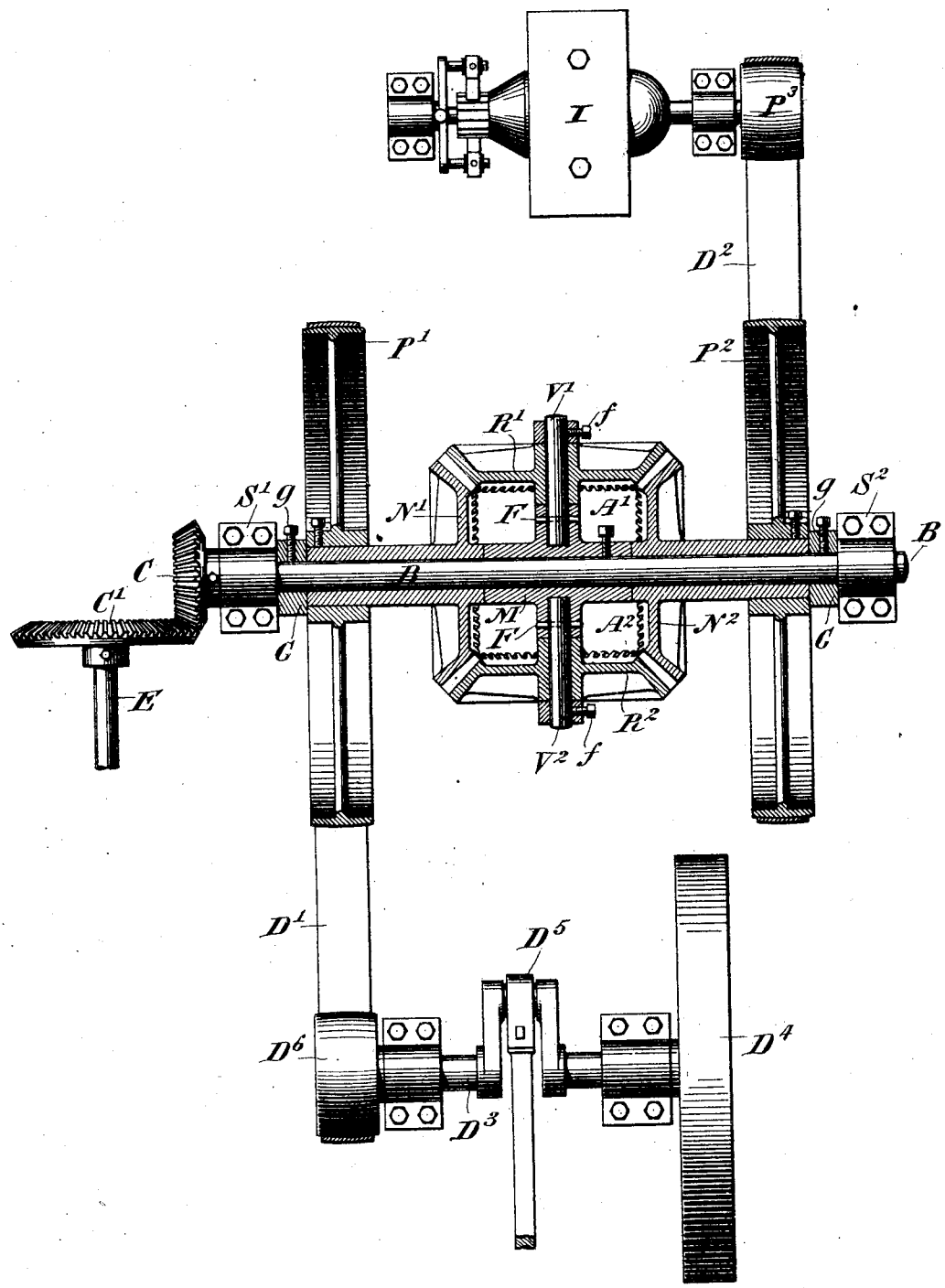

CLARENCE E. DOOLITTLE, OF ASPEN, COLORADO.

SPEED-GOVERNOR.

SPECIFICATION forming part of Letters Patent No. 502,557, dated August 1, 1893.

Application filed May 19, 1891. Serial No. 393,254. (No model.)

*To all whom it may concern:*

Be it known that I, CLARENCE E. DOOLITTLE, a citizen of the United States, and a resident of Aspen, Colorado, have invented a new and useful Improvement in Speed-Governors, of which the following is a specification.

My invention relates to an improvement in speed governors for all kinds of motors and particularly for water wheels and other motors which require to be readily controlled.

The invention relates particularly to that class of governors, in which the various parts are so connected with the source of power to be governed, and a normal or constant source of power, that when the speeds of the two sources of power vary the parts of the governor are set in motion and operate to restore or re-establish the normal relations between the two.

The object of the invention is to produce great simplicity of construction, combined with great efficiency in governing motors, that are subject to sudden fluctuations of speed.

The invention will be best understood by reference to the accompanying drawing which shows the invention in the simplest form arranged to be applied to an ordinary water wheel.

In the drawing E is a rotary shaft which is so arranged that by turning the same the gate of the water wheel is opened or shut and the amount of water supplied to the water wheel to be governed is increased or diminished.

C' is a beveled gear wheel keyed to the extremity of the shaft E whereby motion is transmitted thereto.

B B is a rotating horizontal shaft supported by two or more bearings S' S² attached to any convenient permanent surface in any convenient manner.

N' and N² are two beveled gears which run loosely on the shaft B B, to which are respectively attached two pulleys P' and P² rigidly connected with the gears by means of sleeves as shown, or in any convenient manner. One of the pulleys P' is belted to the water wheel or other motor to be governed by an ordinary driving belt D', while the other, P² is driven in an opposite direction by the driving belt D² which passes over a pulley P³ on the driving shaft of a dynamo, I, running at a constant speed, or with the driving shaft of a constant speed water wheel or other source of constant speed. The pulley P' is connected by a belt D' with a pulley D⁶ on the main driving shaft D³ of the motor to be governed, of which D⁴ represents the driving wheel and D⁵ the driving rod.

The shaft B carries at one extremity a beveled gear C or other equivalent device for transmitting the rotary motion of the shaft B to the shaft E and thence to the gate of the water wheel to be governed.

V' is a secondary arm rigidly attached at right angles to the shaft B B carrying on its extremity a beveled gear R' which is attached thereto in any convenient manner so that it is free to turn about V' as an axis and which is of such dimensions and is so arranged, that the teeth on the periphery of the beveled gear R' engage with the teeth of the beveled gear N' and N² and mesh easily with the same. For the sake of symmetry a second vertical arm V² may be keyed to the shaft B B directly opposite thereto, and a second beveled gear R² provided also, arranged to mesh into the gears N' and N², but this double construction is not essential, and will only be used when convenient.

The method of operation of the governor is as follows: Assuming that the pulley P² and the gear N² derive their motion from a water wheel or other motor independent of the wheel the speed of which is to be governed, and that the pulley P' and the gear N' derive their motion from the wheel which is to be controlled, so long as the gears N' and N² have equal velocity of rotation in opposite directions, the gears R' and R² will revolve freely on the arms V' and V² and these arms and the connected shaft B B will remain stationary and fixed. If, however, the speed of the gear N' varies at any time from that of the gear N², the result will be to effect a motion of the gears R' and R² such that these gears R' and R² will then change their position in space, and run around on the gears N' and N² at a rate proportionate to the difference between the velocities of the gears N' and N², thereby causing the arms V' and V² to rotate in a vertical plane and thus cause the shaft B B and the gear C to turn, and rotate the shaft E correspondingly and so diminish or increase the supply of water or other power as the case may be. If the rate of rotation of the gear N² is constant then that of the gear N' and of the wheel to be controlled will also be maintained approximately constant.

In the application of the invention to a water power station for supplying electric light and power, or for any other similar purpose, one water motor can be provided with a constant load and thus made to revolve at constant speed and drive a counter shaft which may carry pulleys to drive the gears N² on one or more separate governors for each of the main water wheels in the station. Or, one wheel may be used for driving some dynamo not subject to sudden changes in load and which can be maintained at constant speed by hand or by an ordinary friction governor and by means of the invention this water wheel may be made to control the speed of any or all other water wheels used in the station for any purposes which are subject to many great and sudden changes of load.

The form of governor above described is especially adapted to the purpose of controlling the speed of such water wheels or other motors as are subject to great and sudden fluctuations in load for the reason that the speed with which the governor acts will depend in each case upon the rate at which the speed of the water wheel to be governed is changing.

The details of construction may be varied from time to time as may be found convenient provided the principle be adhered to, the gist of the invention consisting in the arrangements of the parts in such a manner that when the speed of the motor to be governed is the same as that of the constant or normal speed motor, the parts of the governing device will remain stationary and the device will only begin to operate at such time as the speed of the governed motor fluctuates or varies from that of the normal motor.

I claim as my invention—

1. The combination, substantially as hereinbefore set forth with the motor to be governed, and a second motor running at a constant speed, of a governing device composed of two sets of parts rotating loosely upon a shaft connected with the supply valve of the impelling medium of the motor to be governed, one of which set of parts is connected with the governed motor and the other with the constant speed motor, and each of which engages with a device for causing the shaft to rotate and control the supply valve of the governed motor, when the speed relations of the two motors vary.

2. In a governing device for motors the combination substantially as hereinbefore set forth of a rotating shaft actuating the controlling valve of a prime mover to be governed, a loose gear wheel on said shaft actuated by the prime mover to be governed, a second loose gear wheel on said shaft actuated in an opposite direction by a second independent prime mover moving at a constant speed, and means substantially as described for causing said gear wheels to rotate the shaft and so operate the controlling valve of the first prime mover when the velocity of the first prime mover varies.

3. In a governing device for motors the combination substantially as hereinbefore set forth of a rotating shaft coupled to the controlling valve of the motor, two beveled gears rotating loosely on said shaft, one of which is driven from the shaft of the motor to be governed and the other of which is driven in an opposite direction from an independent source of constant speed, vertical arms keyed to the loose shaft between the gears and a beveled gear engaging with the beveled gears on the loose shaft attached loosely to said vertical arms for the purposes set forth.

In testimony that I claim the foregoing as my invention I have signed my name, in presence of two witnesses, this 11th day of May, 1891.

CLARENCE E. DOOLITTLE.

Witnesses:
JAS. H. DEVEREUX,
C. F. BROWN.